Feb. 6, 1923.

J. H. RAND

INDEX FRAME

Filed Feb. 17, 1921

1,444,358

Inventor;
James H. Rand,
by
Roberts, Roberts & Cushman
his Attys

Patented Feb. 6, 1923.

1,444,358

UNITED STATES PATENT OFFICE.

JAMES H. RAND, OF NORTH TONAWANDA, NEW YORK.

INDEX FRAME.

Application filed February 17, 1921. Serial No. 445,715.

*To all whom it may concern:*

Be it known that I, JAMES H. RAND, citizen of the United States, and resident of North Tonawanda, in the county of Niagara and State of New York, have invented new and useful Improvements in Index Frames, of which the following is a specification.

This invention relates to frames for indexes of the so-called visible index type in which a series of index elements such as overlapping index cards, name strips or the like, are supported in a frame. Frames for indexes of this character usually comprise a substantially flat longitudinally extending back plate having its lateral edges inturned or flanged to provide guide channels extending lengthwise of the plate adjacent its edges. The channels serve to retain the adjustable and removable index elements in proper relative position.

As heretofore constructed, such inturned or flanged portions of the plate have usually terminated in a free edge of the sheet metal of which the frame is formed, and it is sometimes difficult to finish the raw edge so as to insure a handsome appearance and a smooth surface on which the index elements will readily slide. Furthermore such flanges as heretofore formed, have consisted of a single thickness of the metal of the plate, overhanging the main portion of the plate and spaced therefrom to form the channel as aforesaid. As thus arranged, it requires but a comparatively light blow to bend the flange inwardly toward the plate to such an extent as to interfere with or prevent the proper use of the index elements.

The present invention has for its object the improvement in appearance of the frame, the improvement in the smoothness and regularity of the channel surface on which the index elements slide, and at the same time the strengthening of the flange whereby to render it much less liable to damage from accidental blows. To this end the plate forming the frame may be provided at its edge with a substantially semicircular or arched bead having its curved surface directed outwardly from the back plate and its flat face arranged parallel to the surface of the plate and spaced therefrom to provide the usual guide channel. Preferably such bead will be of tubular construction and supported at a point intermediate its lateral edges, the flat face at one side thus overlapping the back plate, and at the other side extending outwardly beyond the edge of the plate, and the center of curvature of the bead being not far removed from such point of support. As a convenient mode of forming such bead, the plate may be subjected to successive punching or pressing operations.

By the employment of a channel forming member of arched or curved form a strong and stiff construction is obtained, which in large measure serves to prevent accidental closing of the channel by blows or careless handling of the device. Furthermore as the curved face of the channel forming member is presented toward the front of the device, the appearance of the same from a commercial and aesthetic standpoint is greatly improved, while by supporting the tubular member at a point intermediate its lateral edges the structure is still further stiffened, as a blow striking upon the curved surface has but little tendency to tip the channel forming member about its point of support so as to close the channel.

While as herein shown the tubular member is of substantially semi-circular formation, it is evident that many of the advantages above indicated may be attained by the use of other forms of tubular structure or even in some cases by the employment of a solid channel forming member of suitable cross section to insure the proper stiffness and smoothness of the channel surface.

Figure 3:
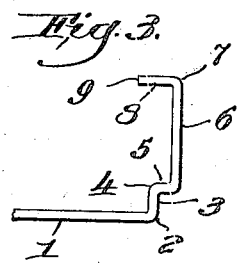
Figs. 3 and 4 are fragmentary details in edge view illustrating the mode of producing the channel forming members.
Figure 4:
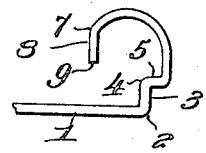

1 is a back herein shown in the form of a flat plate preferably of sheet metal. As a convenient mode of making the frame forming the subject matter of this invention, the opposite margins of this plate may be turned up at 2 (see Fig. 3) to provide webs 3 extending substantially at right angles to the surface of the plate. The height of each web 3 is substantially equal to the front to rear depth of the guide channel with which the frame is to be provided. Thence the turned-up margin is bent at the point 4 to provide an outwardly extending shoulder portion 5 lying in a plane substantially parallel to the plate 1. Thence the margin is reversely bent-up substantially at right angles to the shoulder portion 5 forming a straight section 6, and the free edge of the margin is again bent at 7 to form inwardly directed straight portions 8 terminating at 9. The above described formation is illustrated in Fig. 3 and may be deemed the first stage in forming the bead. By a further operation, shown partly carried out in Fig. 4, the portion 6 is curved over inwardly until the end 9 comes substantially in contact with the web 3 adjacent the bend 4, the flat lip 8 then lying substantially in the plane of the part 5.

Figure 1:
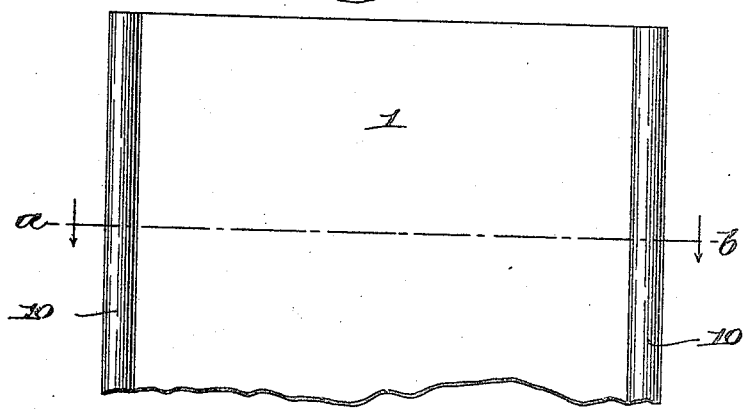
Fig. 1 is a front elevation of a portion of the frame of an index of the class described.
Figure 2:
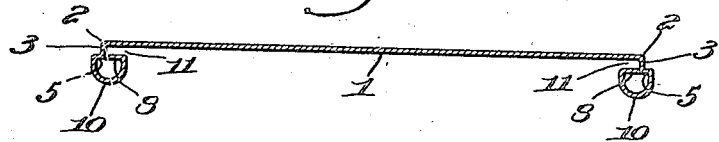
Fig. 2 is a cross section of the frame shown in Fig. 1 on the line *a—b* thereof.

It will be seen by inspection of Fig. 2, that the above process results in the production of tubular beads of curved or arched cross section extending longitudinally of the plate 1 adjacent its edges, such beads being of arched, substantially semi-circular cross section having front curved faces 10, and rear straight faces comprising the members 5 and 8. The members 8 are spaced from the body portion of the plate 1 by means of the members 3 thus providing the guide channels 11 for receiving the index elements. The member 3 which constitutes a support for each bead intersects the rear side of the bead on a line intermediate its edges, the shoulder 5 of the bead thus extending outwardly beyond the edge of the plate 1 as defined by the point 2.

In use the device above described will be employed in the usual manner, the channels 11 serving as guides for the movable index elements. By forming the beads as hollow tubes, any substantial increase in weight of the device is avoided, while at the same time the structure is greatly strengthened longitudinally, serving not only to prevent accidental closing of the guide channels, but also to avoid longitudinal warping of the frame as a whole. Moreover the free edge 9 of the bent-up margin terminates at the bottom of the channel 11, where any roughness or irregularity of the edge will not affect either the smooth working of the index elements in the channel, or the finished appearance of the frame; and the outer edge of the channel defined by the rounded bend 7 will be smooth and straight to permit the index elements to slide lengthwise in the channel freely and easily.

By connecting the web 3 to a line intermediate the sides of the hollow bead, as shown, the bead is somewhat offset by the shoulder 5 from the edge of back 1, that is, one side of the bead projects beyond the edge of the back. This not only results in adding strength to the frame as already explained, but gives it an appearance of greater thinness and lightness, even when viewed from a considerable angle in front, than it would possess if the web 3 were connected to the extreme side edge of the bead.

I claim:

1. An index frame comprising a back and a bead formed of sheet material bent-up to form a transversely arched outer face and a substantially flat inner face, said bead being spaced from said back adjacent the edge thereof to form a longitudinally extending channel between the inner face of the bead and the back.

2. An index frame comprising a back, a tubular bead having a transversely arched outer face and a substantially flat inner face, and a web connecting the bead to the edge of the back and holding the bead in spaced relation to the back to form a channel between the inner face of the bead and the back.

3. An index frame comprising a back, a tubular bead having a transversely arched outer face and a substantially flat inner face, and a web connecting the bead to the edge of the back and holding the bead in spaced relation to the back to form a channel between the inner face of the bead and the back, the bead being so mounted on the web that one side of the bead projects beyond the edge of the back.

4. An index frame comprising a back of sheet material having its margin bent up to form a connecting web thence bent laterally to form an offset shoulder, and thence reversely bent to form a hollow bead spaced from the back and forming therewith a longitudinal channel.

5. An index frame comprising a back and a bead formed of sheet material bent-up to form a transversely arched outer face and a substantially flat inner face, said bead being spaced from said back adjacent the edge thereof to form a longitudinally extending channel between the inner face of the bead and the back, and a web connecting the edge of the back and the flat face of the bead along a line intermediate the sides of the latter.

6. An index frame comprising a back of sheet material having its margin bent up at substantially a right angle to the back, thence outwardly in a plane substantially parallel to the back, thence upwardly and inwardly in a curve over the edge of the back, and thence bent under and terminating in a flat lip forming a channel with the back.

Signed by me at North Tonawanda, New York, this fourteenth day of February, 1921.

JAMES H. RAND.